United States Patent [19]

Takasago et al.

[11] Patent Number: 4,542,491
[45] Date of Patent: Sep. 17, 1985

[54] OPTICAL INFORMATION DISC APPARATUS WITH AUTOFOCUSING SERVO SYSTEM

[75] Inventors: Masahiro Takasago; Takeshi Maeda, both of Odawara; Motoo Uno, Kokubunji; Yasumitsu Mizoguchi, Odawara, all of Japan

[73] Assignee: Hitachi, Ltd., Tokyo, Japan

[21] Appl. No.: 438,774

[22] Filed: Nov. 3, 1982

[30] Foreign Application Priority Data

Nov. 17, 1981 [JP] Japan ................................. 56-184091

[51] Int. Cl.[4] .............................................. G11B 7/00
[52] U.S. Cl. ..................................................... 369/45
[58] Field of Search ..................... 358/342; 369/43, 44, 369/45, 46; 250/201

[56] References Cited

U.S. PATENT DOCUMENTS 4,128,847 12/1978 Roullet et al. ..................... 369/45
4,357,696 11/1982 Bierhoff et al. ..................... 369/45

Primary Examiner—Robert L. Richardson
Attorney, Agent, or Firm—Antonelli, Terry & Wands

[57] ABSTRACT

An optical information disc apparatus includes a laser source, a recording medium with an information track, an optical system for emitting a laser beam from the laser source onto the information track, a photodetector detecting the focus error of the optical system using the light reflected from the information track, and an auto-focusing servo system operating the optical system to make the focus of the system follow the upward and downward movement of the recording medium, the optical information disc apparatus being further provided with a control circuit to make the auto-focusing servo system effective only when the optical system is in a position equivalent to the linear region of a defocusing signal having an S-curve characteristic.

10 Claims, 18 Drawing Figures

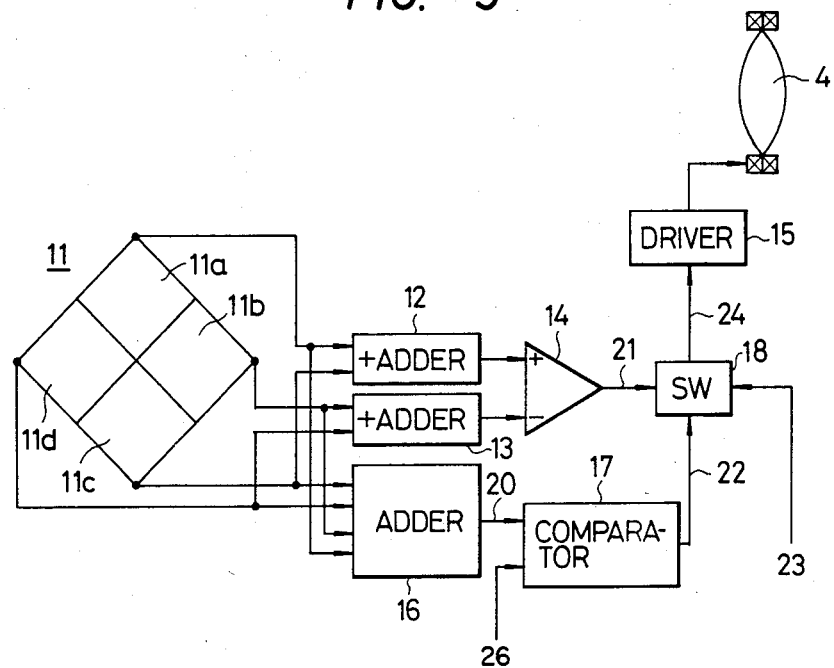
FIG. 3
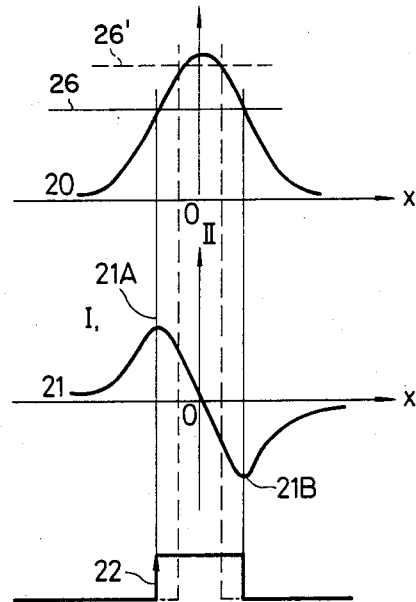
FIG. 4A
FIG. 4B
FIG. 4C

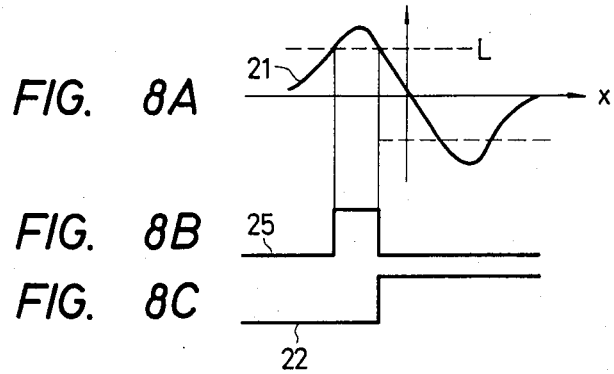
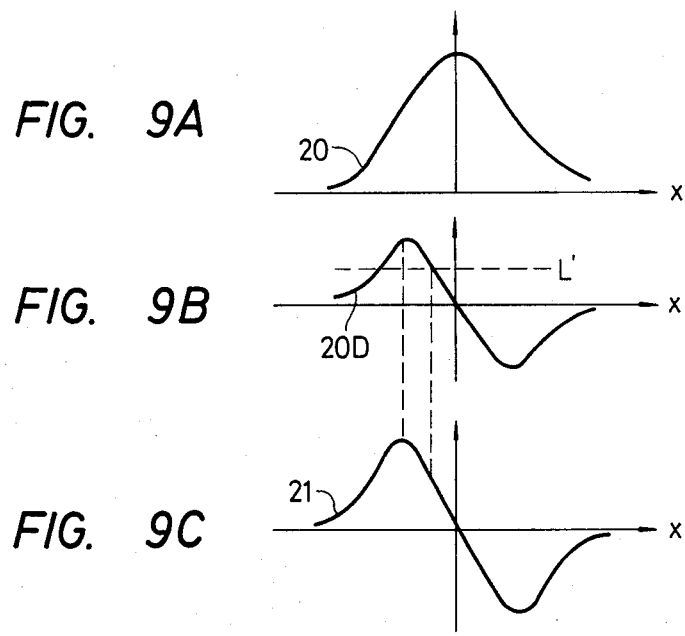

OPTICAL INFORMATION DISC APPARATUS WITH AUTOFOCUSING SERVO SYSTEM

BACKGROUND OF THE INVENTION

1. Field of the Invention

This invention relates to an optical information disc apparatus, and more particularly to improvements to an optical information disc apparatus having an autofocusing servo system.

2. Description of the Prior Art

When information is being recorded on an optical information disc apparatus, holes called pits are made in a metal film formed on a rotary disc by modulating the power of a laser beam according to the information, and the information is read from the disc by determining the amount of light reflected from the disc depending on the presence and absence of pits by collecting and shining a weak laser beam on the metal film containing the information. In a video disc apparatus which is used solely for reproduction, information is read out by shining a laser beam onto a replica made from the original disc through a similar process to that applied to conventional LP records.

For an optical information disc apparatus, one of the basic techniques for controlling the apparatus is autofocusing, by which a converging lens is moved according to the upward and downward movements of the optical disc while the information is being reproduced so that the pits in the surface of the disc are always within the depth of focus of the laser spot. Several methods for an auto-focusing servo system applied to an optical disc apparatus have been proposed, each of which is characterized by a method of detecting the focus error by the variations of the light reflected from the surface of the disc. For instance, U.S. Pat. No. 4,293,944 disclosed an auto-focusing method using the astigmatic optical system shown in FIG. 1.

In FIG. 1, a laser beam 2 emitted from a laser source 1 such as a semiconductor laser, passes through a beam splitter 3 and a converging lens 4 and is focused onto a information track 6 of a disk 5. The reflected laser beam containing the information from the information track 6 passes through the converging lens 4, is reflected by the beam spliter 3 and is focused in only one plane by a cylindrical lens 7 so that it is converted into a non-regular beam. Accordingly, the cross-section of the reflected laser beam is wider in the X-direction at a point 8 (the point at which the reflected laser beam is focused by the converging lens 4 and the cylindrical lens 7), and it is wider in the Y-direction at a point 9 (the focus of the converging lens 4). The reflected laser beam at an intermediate point 10 (a point which is substantially at the mid-point between the points 8 and 9) exhibits a circular cross-section which has substantially the same dimensions in the X- and Y-directions. If the disk 5 moves in the direction in which it comes closer to the converging lens 4, the cross-section of the reflected laser beam at the point 10 becomes wider in the X-direction. Conversely, if the disk 5 moves in the direction in which it goes away from the converging lens 4, the cross-section of the reflected leser beam at the point 10 becomes wider in the Y-direction.

FIG. 2 is a schematic block diagram of an arrangement in which a photodetector 11 having four photocells 11a–11d is placed at the point 10 shown in FIG. 1. The signals of two 11a and 11c of the four photocells of the photodetector 11 are added by an adder 12, and the signals of the other two photocells 11b and 11d are added by another adder 13. The outputs from the two adders 12 and 13 are input to a differential amplifier 14. The output from the differential amplifier 14 is input to a driver 15 for the converging lens 4. The driver 15 moves the converging lens 4 either towards the disk or away from it in response to the output from the differential amplifier 14. More specifically, when the laser beam is exactly focused on the disk 5, the cross-section of the reflected laser beam on the photodetector 11 becomes a circular pattern which has equal dimensions in the X- and Y-directions as indicated by a solid line (a), so that the light intensity is evenly distributed, and the output of the differential amplifier 14 is zero. Therefore, the converging lens 4 is not moved. If the disk 5 moves so that it comes closer to the converging lens 4, the cross-section of the reflected laser beam becomes wider in the X-direction as indicated by the dashed line (b). Consequently, the output of the differential amplifier 14 becomes negative, and the converging lens 4 is moved away from the disk 5. Similarily, if the disk 5 moves away from the lens 4, the cross-section becomes wider in the Y-direction as indicated by the dashed line (c), the output of the differential amplifier 14 becomes positive, and the converging lens 4 is moved closer to the disk 5.

Other known auto-focusing methods include one using an off-center auxiliary beam in which, in addition to the main laser beam for reading out information, an auxiliary beam for detecting focusing errors is emitted through the converging lens at a position away from its optical axis so as to detect information based on the position of the reflected auxiliary beam containing information about the up-and-down movements of the disc; another in which masks are arranged asymmetrically about the optical axis within the area of the reflected light with a sensor divided into two parts near the point at which the image is formed, and so on.

However, in prior art optical disc apparatuses the converging lens is first fixed at a predetermined position away from the disc surface before starting to read information from the disc, and then it is moved toward the disc by energizing the voice coil of the converging lens using the output of a ramp generator while the auto-focusing servo system is kept on, so that the optical disc apparatus is induced into an auto-focusing operation. During the above process of moving the converging lens, the signal output from the differential amplifier 14 detecting focus errors varies along an S-curve as is well known. In a conventional apparatus, since the auto-focusing servo system is made to start the focusing operation when the converging lens is located at the base of the S-curve characteristic, a non-linear servo-operation occurs, causing a limiting cycle to be introduced depending on the time constant of the compensating circuit of the servo system, or the characteristics of the lens actuator, and this poses the problem of inducing low frequency vibrations in the auto-focusing operation.

SUMMARY OF THE INVENTION

An object of the present invention is to eliminate the previous drawbacks of the prior art and provide an optical information disc apparatus in which an auto-focusing operation is secured.

To accomplish the objects of the present invention, an optical information disc apparatus is provided comprising a recording medium with a track for recording information; a first optical means for emitting a laser beam from a laser source onto the information track on the recording medium; a first detecting means for detecting the laser beam reflected from the information track as an electric signal; and an auto-focusing means for operating the first optical means in response to the output signal generated by the first detecting means; the optical disc apparatus further comprising a second driving means for driving the first optical means so as to change the relative distance between the first optical means and the recording medium; a timing signal generation means generating a timing signal indicating that the first optical means and the recording medium have a predetermined positional relationship, and a switching means for making effective either the second driving means or the auto-focusing means corresponding to the state of the timing signal.

The above and further objects and novel features of the present invention will more fully appear from the following detailed description when it is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a circuit diagram illustrating an example of an auto-focusing method according to the present invention.

FIGS. 4A–4C are signal waveform charts illustrating the operating principle of the circuit of FIG. 3.

FIGS. 8A–8C are signal waveform charts of a third embodiment of the present invention.

FIGS. 9A–9C are signal waveform charts of a fourth embodiment of the present invention.

DESCRIPTION OF THE PREFERRED EMBODIMENTS

Figure 1:
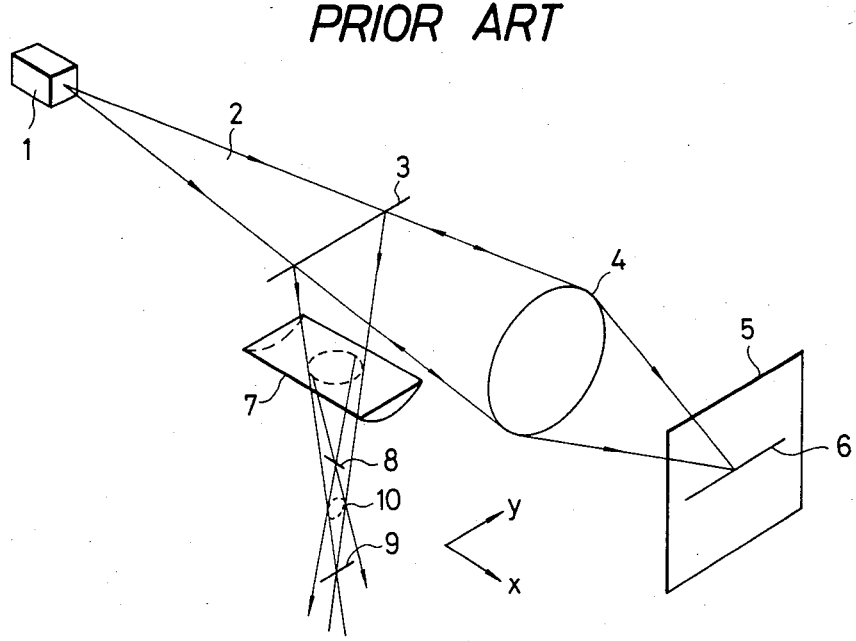
FIG. 1 is an idealized view illustrating an example of a conventional auto-focusing optical system.
Figure 2:
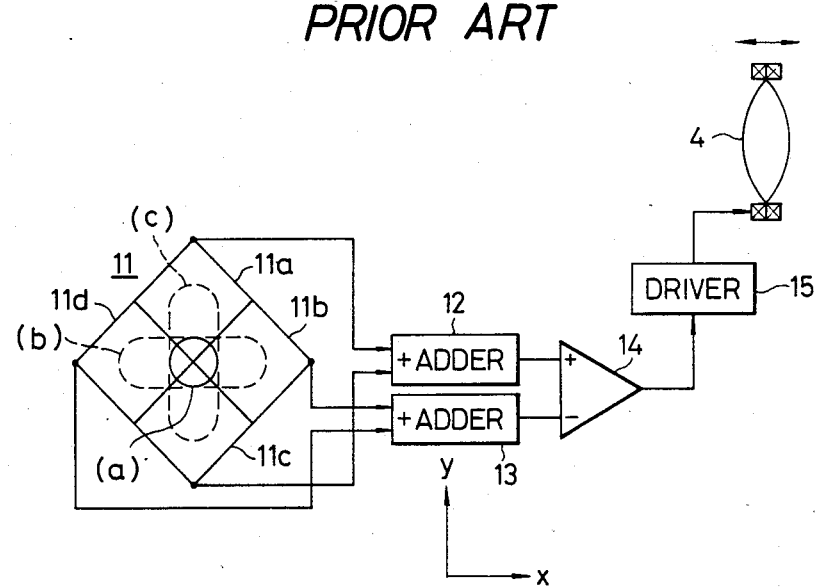
FIG. 2 is an example of a detection circuit for detecting focus errors in the conventional auto-focusing method of FIG. 1.

FIG. 3 shows an embodiment of the present invention applied to the astigmatic auto-focusing servo system illustrated in FIG. 2. If the output signals of the four photocells 11a–11d are added by means of a third adder 16, its output signal 20 will be proportional to the total amount of light reflected from the disc surface. If the focus error between the surface of the optical disc and the converging lens 4 is along the horizontal axis, the intensity signal will vary as shown in FIG. 4A. The maximum value of intensity is obtained when the surface of the optical disc is at the focus of the converging lens 4. In addition, the focus error signal 21 output from the differential amplifier 14 changes in the form of the S-curve shown in FIG. 4B (an inverse S-curve in this case).

Figure 5A:
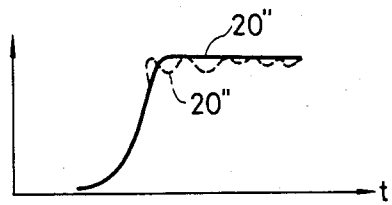
FIGS. 5A and 5B are signal waveform charts illustrating the total amount of reflected light and the focus error during auto-focusing, respectively.
Figure 5B:
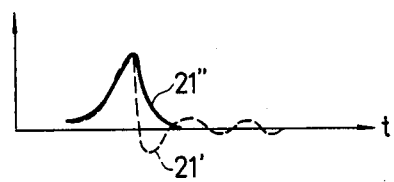

In order to move the converging lens 4 to the focus position, in accordance with the present invention, the position of the converging lens 4 is first controlled by a control signal 23 so that it is moved from a position away from the disk so as to approach the disc. While the converging lens 4 is within the base region I of the S-curve shown in FIG. 4B, a switch 18 is used to cut the input of the servo signal 21 generated by the differential amplifier 14 to the driving circuit 15. When the converging lens 4 is moved into the linear region II of the S-curve, the switch 18 is changed over so that the servo output controls the position of the converging lens 14 instead of the control signal 23. The switch 18 is changed over when the output signal 20 from the adder 16 exceeds a slice level 26 and when a timing pulse signal 22 generated by a comparator 17 starts to rise. By selecting a slice level 26 corresponding to the peaks 21A, 21B of the servo signal 21, the rise of the timing signal 22, as shown in FIG. 4C, is set within the linear region of the servo signal 21, so that it can be employed to change the control signal 23 over to the servo signal 21 as appropriate to control the position of the converging lens 4, to ensure the auto-focusing operation. FIGS. 5A, 5B show the total reflected light signal 20′ and the servo signal 21′ after the auto-focusing operation. If a compensating circuit is inserted into the auto-focusing servo system and an appropriate time constant is provided overshoot of the total reflected light signal and the servo signal can be eliminated, so that 20″, 21″ can quickly reach stable values.

Next, the description of another embodiment for generating a timing signal to start the operation of the auto-focusing servo system is given below.

Figure 6:
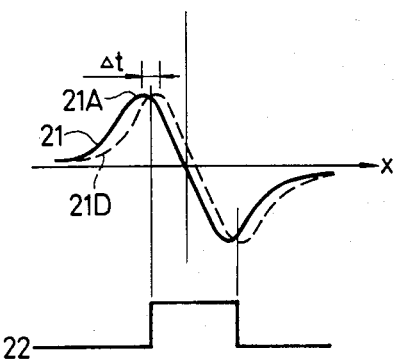
FIG. 6 is a signal waveform chart of another embodiment of the present invention.
Figure 7A:
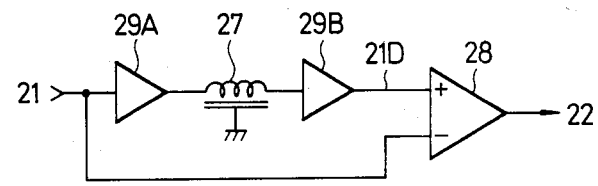
FIGS. 7A and 7B are circuit diagrams of the construction of timing signal generating circuits for the above second embodiment.
Figure 7B:
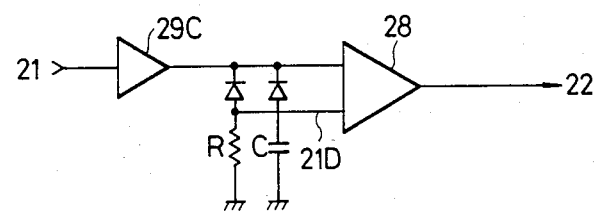

In FIG. 6, illustrating the second embodiment, the peak 21A of the focus error signal 21 is the start point of the linear region. Accordingly, a pulse signal 22 which rises at the point at which the signal 21 crosses a signal 21D obtained by delaying the signal 21 by a very small amount of time $\Delta t$ may be utilized for the switchover control of the switch 18. FIGS. 7A and 7B each show circuits for generating the timing signal 22 based on the idea shown in FIG. 6. In FIG. 7A, the circuit obtains the signal 21D by passing the signal 21 detecting the focus error through a delay line 27, and it compares the signal 21D with the signal 21 using a comparator 28 to generate the timing signal 22. On the other hand, FIG. 7B shows a circuit in which the focus error signal 21 is delayed by a RC circuit. 29A, 29B, 29C are each buffer amplifiers.

FIGS. 8A–8C illustrate a third embodiment. The focus error signal 21 is sliced at a predetermined level L, as shown in FIG. 8A, to produce a pulse signal 25 shown in FIG. 8B. The trailing edge of the pulse 25 is within the linear region of the signal 21. Therefore, a pulse such as that shown in FIG. 8C, which rises at the trailing edge of the pulse 25 can be utilized as the timing signal 22. If the slice level L is selected according to the relative velocity of the optical disc and the converging lens, and the characteristics of the auto-focusing servo system, it is possible to optimize the characteristics of moving the converging lens to the proper position.

FIGS. 9A and 9B illustrate a fourth embodiment. The signal 20D obtained by differentiating the total reflected light signal 20 shown in FIG. 9A is similar to the signal 21 detecting focus error shown in FIG. 9C. As a result, even if the signal 20D is sliced at a level L′, the switching signal 22 will still be obtainable as in the third embodiment.

Figure 10:
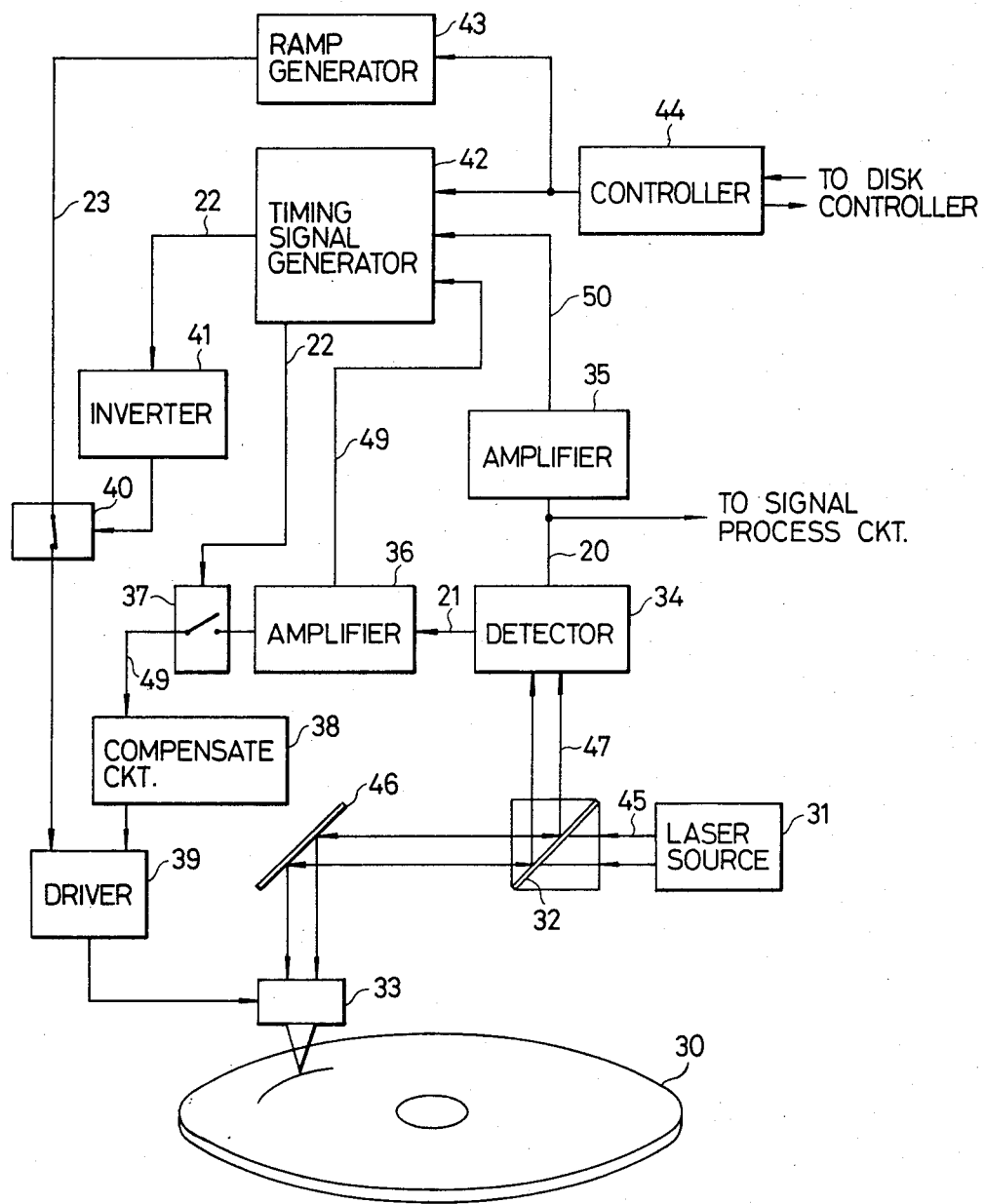
FIG. 10 shows the complete structure of an auto-focusing control system of an optical information disc apparatus according to the present invention.

FIG. 10 illustrates the total structure of an auto-focusing control system of an optical information disc apparatus to which the present invention has been applied.

A laser beam 45 emitted from a laser source 31 passes through a beam splitter 32 and a deflection mirror 46. The beam is then focused by a converging lens incorporated in an auto-focusing mechanism 33, before being shone onto a disc 30. The beam reflected from the disc 30 passes through the auto-focusing mechanism 33 and the deflection mirror 46 and is incident upon a beam splitter 32 whereby the reflected light is separated from the light incident upon the splitter and then input to a photodetector 34. The photodetector, which is constructed like that illustrated in FIG. 3, or any other conventionally constructed photodetector, outputs the focus error signal 21 and a total reflected light signal 20 from the reflected beam 47.

The focus error signal 21 is input to a driving circuit 39 which drives the auto-focusing mechanism 33 via an amplifier 36, a switch 37 and a compensating circuit 38. The compensating circuit 38 is designed to stabilize the operation of the auto-focusing servo system consisting of the elements 33, 34, 36, 37, 39, the circuit being composed of a time lag or gain element.

An output 49 from the amplifier 36, which amplifies the focus error signal 21, together with an output 50 from an amplifier 35, which amplifies the total reflected light signal 20, are input to a timing signal generation circuit 42. This timing signal generation circuit 42 is used to process the signal indicating the amount of focus error and/or the signal 50 showing the total amount of reflected light through one of the methods illustrated in FIGS. 4A~9C, while its operation is controlled by start or stop instructions given by a controller 44. 43 is a ramp generator used to move the converging lens initially and to generate a driving signal for moving the converging lens into a range within which the auto-focusing operation is possible. When the start instruction is given by the controller 44, the ramp generator 43 outputs a converging lens control signal 23. At the same time, the output of the timing signal 22 from the circuit 42 is low, the switch controlled by the output of an invqrter 41 inverting the timing signal 22 is on, and a switch 37 controlled by the timing signal 22 is off. Therefore, the converging lens is driven by the output of the ramp generator, but the auto-focusing servo system is not operating. When the position of the converging lens is in the linear region of the above S-curve, the timing signal 22 goes high, so that the switches 37 and 49 are turned on and off, respectively. For this reason, the auto-focusing servo system starts to operate and the position of the converging lens is so controlled that the focus error signal 21 becomes zero.

Once focus positioning has been completed, it is very rare for the focus to slide away from the correct position even if the optical head conducts a sequential operation from one track to another. Should the focus stray out of the error correction range of the auto-focusing system because of a disturbance, or when rotation is restarted after the disc has been stopped, the controller 44 will reset the timing signal 22 based on the instruction given by the disc controller, the controller not only starts the ramp generator but also repeats the start of the above auto-focusing.

As mentioned above, since the focusing operation according to the present invention is possible without using the non-linear parts of a focus error signal, an auto-focusing servo system will not start any non-linear servo operation, thus preventing the system from entering a limiting cycle and enabling the system to accomplish a stable focusing operation.

Although the switch 37 is placed between the amplifier 36 and the compensating circuit 38 in FIG. 10, the switch may be provided between the compensating circuit 38 and the driving circuit 39, or between the driving circuit 39 and the auto-focusing mechanism.

We claim:

1. An optical information disc apparatus for optically scanning a recording medium on which information is recorded, comprising:
   optical means including a laser source and a converging lens for focusing a laser beam from a laser source into said recording medium;
   first detecting means for detecting the laser beam reflected from said recording medium and for producing electric signals which indicate a focus error representative of the extent to which the laser beam is out of focus on said recording medium;
   driving means for varying the relative distance between said converging lens and said recording means;
   first circuit means responsive to the output of said first detecting means for generating a focus error signal for application to said driving means so as to establish with said first detecting means and said driving means an auto focus servo system;
   second circuit means for generating a gradual control signal to be applied to said driving means when said converging lens is spaced from said recording medium by more than a predetermined amount so that said converging lens is moved toward said recording medium in response to the gradual control signal;
   second detecting means for generating a timing signal indicating that said converging lens and said recording medium have a predetermined relationship; and
   switching means connected to said first and second circuit means for applying said gradual control signal to said driving means in the absence of said timing signal and for applying said focus error signal to said driving means instead of said gradual control signal in response to said timing signal.

2. An optical information disc apparatus according to claim 1, wherein one of said electric signals produced by said first detecting means is a first signal which is proportional to the total amount of light from the laser beam reflected from said recording medium; and wherein said second detecting means generates said timing signal by detecting a predetermined condition in said first signal.

3. An optical information disc apparatus according to claim 2, wherein said second detecting means includes means for generating said timing signal when said first signal exceeds a predetermined slice level.

4. An optical information disc apparatus according to, wherein said second detecting means comprises a means for differentiating said first signal, another means for generating a pulse during the time the signal output from said differentiating means exceeds a predetermined slice lever, and still another means for generating said timing signal at the falling edge of said pulse.

5. An optical information disc apparatus according to claim 1, wherein said second detecting means includes means for delaying said focus error signal by the predetermined length of time, and comparing means for comparing the output of said delaying means and said focus error signal, said timing signal being output from said comparing means.

6. An optical information disc apparatus according to claim 1, wherein said second detecting means includes means for generating a pulse during the time said focus error signal exceeds a predetermined slice level, and means for generating said timing signal at the falling edge of said pulse.

7. An optical information disc apparatus according to claim 8, further provided with control means for controlling said second circuit means and said switching means for initializing said switching means and for starting the operation of said second circuit means on the receipt of instructions from higher level apparatus.

8. An optical information disc apparatus according to claim 1, wherein said second detecting means includes means for producing said timing signal from said focus error signal.

9. An optical information disc apparatus according to claim 1, wherein said driving means includes a ramp signal generator.

10. An optical information disc apparatus according to claim 1, wherein said second detecting means comprises means for detecting when said focus error signal is at a linear portion of its characteristic and for generating said timing signal only in response to such detection.

* * * * *